United States Patent
Han et al.

(10) Patent No.: US 10,224,538 B2
(45) Date of Patent: Mar. 5, 2019

(54) POSITIVE ELECTRODE FOR RECHARGEABLE LITHIUM BATTERY AND RECHARGEABLE LITHIUM BATTERY INCLUDING THE SAME

(71) Applicant: Samsung SDI Co., Ltd., Yongin-si, Gyeonggi-Do (KR)

(72) Inventors: Jeong-Woo Han, Yongin-si (KR); Young-Kee Kim, Yongin-si (KR); Sun-Il Park, Yongin-si (KR); Sumihito Ishida, Yongin-si (KR)

(73) Assignee: Samsung SDI Co., Ltd., Gyeonggi-do (KR)

(*) Notice: Subject to any disclaimer, the term of this patent is extended or adjusted under 35 U.S.C. 154(b) by 936 days.

(21) Appl. No.: 13/932,463

(22) Filed: Jul. 1, 2013

(65) Prior Publication Data

US 2014/0199587 A1 Jul. 17, 2014

Related U.S. Application Data

(60) Provisional application No. 61/753,336, filed on Jan. 16, 2013.

(51) Int. Cl.

| | |
|---|---|
| *H01M 4/36* | (2006.01) |
| *H01M 4/485* | (2010.01) |
| *H01M 4/583* | (2010.01) |
| *H01M 4/131* | (2010.01) |
| *H01M 4/505* | (2010.01) |
| *H01M 4/525* | (2010.01) |
| *H01M 4/58* | (2010.01) |

(Continued)

(52) U.S. Cl.
CPC .......... *H01M 4/364* (2013.01); *H01M 4/131* (2013.01); *H01M 4/485* (2013.01); *H01M 4/505* (2013.01); *H01M 4/525* (2013.01); *H01M 4/583* (2013.01); *H01M 4/587* (2013.01); *H01M 4/5825* (2013.01); *H01M 4/623* (2013.01); *H01M 4/625* (2013.01); *H01M 10/0525* (2013.01)

(58) Field of Classification Search
CPC .............................. H01M 4/131; H01M 4/625
See application file for complete search history.

(56) References Cited

U.S. PATENT DOCUMENTS

| | | | |
|---|---|---|---|
| 5,885,544 | A | 3/1999 | Yamazaki et al. |
| 2002/0127473 | A1 | 9/2002 | Ooya et al. |

(Continued)

FOREIGN PATENT DOCUMENTS

| | | |
|---|---|---|
| CN | 101132062 A | 2/2008 |
| CN | 101405898 A | 4/2009 |

(Continued)

OTHER PUBLICATIONS

Science Buddies. "Rock Solid? How Particles Affect Porosity." Scientific American. Mar. 1, 2012. Web. Feb. 21, 2017.*

(Continued)

*Primary Examiner* — Stephan J Essex
(74) *Attorney, Agent, or Firm* — Knobbe, Martens, Olson & Bear, LLP (57) ABSTRACT

In an aspect, a positive electrode for a lithium rechargeable battery including a current collector; a positive active material layer disposed on the current collector, wherein the positive active material layer includes a positive active material, active carbon, and an additive.

15 Claims, 5 Drawing Sheets

(51) Int. Cl.
  *H01M 4/587* (2010.01)
  *H01M 4/62* (2006.01)
  *H01M 10/0525* (2010.01)

(56) References Cited

U.S. PATENT DOCUMENTS

| | | | |
|---|---|---|---|
| 2004/0120882 A1 | 6/2004 | Kumar et al. | |
| 2006/0147800 A1* | 7/2006 | Sato | H01M 4/134 |
| | | | 429/231.95 |
| 2009/0087731 A1* | 4/2009 | Fukui | H01M 4/131 |
| | | | 429/164 |
| 2009/0305143 A1* | 12/2009 | Matsuno | H01M 4/13 |
| | | | 429/332 |
| 2011/0206998 A1 | 8/2011 | Song et al. | |
| 2011/0223487 A1* | 9/2011 | Johnson | H01M 4/0471 |
| | | | 429/319 |
| 2011/0315918 A1 | 12/2011 | Kawai et al. | |
| 2012/0037846 A1* | 2/2012 | Lee | H01M 4/131 |
| | | | 252/182.1 |
| 2012/0064398 A1* | 3/2012 | Kim | B01J 20/20 |
| | | | 429/209 |
| 2012/0244437 A1 | 9/2012 | Han et al. | |
| 2013/0017442 A1* | 1/2013 | Cha | H01M 4/505 |
| | | | 429/211 |

FOREIGN PATENT DOCUMENTS

| | | |
|---|---|---|
| CN | 102376946 A | 3/2012 |
| CN | 102403493 A | 4/2012 |
| EP | 1 391 950 A1 | 2/2004 |
| EP | 1 903 627 A1 | 3/2008 |
| EP | 2 418 719 A2 | 2/2012 |
| EP | 2 429 020 A1 | 3/2012 |
| EP | 2 492 996 A2 | 8/2012 |
| JP | 2001-110418 A | 4/2001 |
| JP | 2008-112594 A | 5/2008 |
| JP | 2008-112595 A | 5/2008 |
| JP | 2011-238586 A | 11/2011 |
| JP | 2012-028313 A | 2/2012 |
| KR | 10-2011-0097459 A | 8/2011 |
| KR | 10-2012-0022554 A | 3/2012 |
| WO | WO 2013/052494 A1 | 4/2013 |

OTHER PUBLICATIONS

Extended European Search Report dated May 6, 2014 for European Patent Application No. EP 13 179 617.9 which claims priority from U.S. Appl. No. 61/753,336, filed Jan. 16, 2013, and captioned U.S. Appl. No. 13/932,463.

First Chinese Office Action dated Mar. 16, 2017 for Chinese Patent Application No. CN 201310484615.1, which claims priority from U.S. Appl. No. 61/753,336, and from subject U.S. Appl. No. 13/932,463.

European Invitation dated Sep. 6, 2016 for European Patent Application No. EP 13 179 617.9, which claims priority from U.S. Appl. No. 61/753,336, filed Jan. 16, 2013, and from subject U.S. Appl. No. 13/932,463.

Korean Office Action dated Oct. 31, 2016 for Korean Patent Application No. KR 10-2013-0089848, which claims priority from U.S. Appl. No. 61/753,336, filed Jan. 16, 2013, and from subject U.S. Appl. No. 13/932,463.

Chinese Office Action dated Aug. 22, 2017 for Chinese Patent Application No. CN 201310484615.1, which claims priority from U.S. Appl. No. 61/753,336, filed Jan. 16, 2013 and subject U.S. Appl. No. 13/932,463, and which cites references previously disclosed in the subject application.

Japanese Office Action dated Jul. 25, 2017 for Japanese Patent Application No. JP 2013-203899, and which claims priority from U.S. Appl. No. 61/753,336, filed Jan. 16, 2013 and subject U.S. Appl. No. 13/932,463.

Third Chinese Office Action dated Jan. 26, 2018 for Chinese Patent Application No. CN 201310484615.1, which claims priority from U.S. Appl. No. 61/753,336, filed Jan. 16, 2013, and from subject U.S. Appl. No. 13/932,463. The Chinese Office Action cites references previously disclosed in the subject application.

Communication Pursuant to Article 94(3) EPC—European Examination Report dated Jan. 28, 2016 for European Patent Application No. EP 13 179 617.9 which claims priority from U.S. Appl. No. 61/753,336, filed Jan. 16, 2103, and subject U.S. Appl. No. 13/932,463. All cited references are previously disclosed in said subject application.

Kamarulzaman, Norlida et al., "Influence of carbon additives on cathode materials, $LiCoO_2$ and $LiMn_2O_4$," *Advanced Materials Research*, vol. 545 (2012) pp. 214-219.

European Examination Report dated Jun. 1, 2015 for European Patent Application No. EP 13 179 617.9 which shares priority of U.S. Appl. No. 61/753,336 with captioned U.S. Appl. No. 13/932,463.

The Fourth Chinese Office Action dated Sep. 4, 2018 for Chinese Patent Application No. CN 201310484615.1, which claims priority from U.S. Appl. No. 61/753,336, filed Jan. 16, 2013, and from subject U.S. Appl. No. 13/932,463. No new references are cited in the Chinese Office Action.

\* cited by examiner

POSITIVE ELECTRODE FOR RECHARGEABLE LITHIUM BATTERY AND RECHARGEABLE LITHIUM BATTERY INCLUDING THE SAME

INCORPORATION BY REFERENCE TO RELATED APPLICATIONS

Any and all priority claims identified in the Application Data Sheet, or any correction thereto, are hereby incorporated by reference under 37 CFR 1.57. For example, this application claims priority to and the benefit of U.S. Provisional Application No. 61/753,336 filed Jan. 16, 2013, the disclosure of which is incorporated herein by reference in its entirety.

BACKGROUND

Field

This disclosure relates to a positive electrode for rechargeable lithium battery and a rechargeable lithium battery including the same.

Description of the Related Technology

Lithium rechargeable battery uses intercalation and deintercalation reactions of lithium ions when battery is charged and discharged. Typically, a lithium rechargeable battery includes a positive electrode comprising positive active material, a negative electrode comprising negative active material, a separator, and an electrolyte solution.

Potentially an ISG (Idle Stop & Go or Integrated Starter & Generator) system will be widely used for electric vehicles, the commercial requirements which experts are expecting exceeds more than 10 billion dollars by the year of 2015.

Conventional lead storage batteries that have been studied for use in the ISG system of a vehicle are very large in volume considering capacity, and have a disadvantage of shortening cycle-life due to charge and discharge cycles.

In order to address these disadvantages, attention has been focused on using lithium rechargeable batteries. Lithium rechargeable batteries generate electricity through oxidation/reduction reactions and have low rate of charging and a short life which limits their use in the applications requiring high input and output powers, such as the ISG system.

In order to obtain high input and output powers, low resistance designs using thin electrodes have been developed. Lithium rechargeable batteries using thin electrodes have limitations due to their material properties, and have problems of having a low capacity, though a high rate has been achieved.

SUMMARY

One embodiment provides a positive electrode for a rechargeable lithium battery that has improved capacity, cycle-life, and high rate charge/discharge properties.

Another embodiment provides a rechargeable lithium battery including the above positive electrode.

Some embodiments provide a positive electrode for a rechargeable lithium battery, including a current collector; and a positive active material layer disposed on the current collector, wherein the positive active material layer comprises a positive active material including a lithium metal oxide; active carbon; and an additive including a transition metal oxide.

Some embodiments provide a rechargeable lithium battery, including a positive electrode as disclosed and described herein; a negative electrode comprising a negative active material; and a non-aqueous electrolyte.

In some embodiments, the transition metal oxide comprises manganese oxide, cobalt oxide, iron oxide, or vanadium oxide, or a combination thereof.

In some embodiments, the manganese oxide is $Mn_3O_4$, the cobalt oxide is $Co_3O_4$, the iron oxide is $Fe_3O_4$, and the vanadium oxide is $V_2O_5$. In some embodiments, the transition metal oxide comprises $Mn_3O_4$ or $Co_3O_4$.

In some embodiments, the positive active material layer may include from about 0.01 to about 15 wt % of said additive, based on the total weight of the positive active material layer.

In some embodiments, the positive active material layer may include from about 0.05 to about 3 wt % of said additive, based on the total weight of the positive active material layer.

In some embodiments, the lithium metal oxide includes lithium cobalt oxide, lithium nickel cobalt manganese oxide, lithium nickel cobalt aluminum oxide, lithium phosphoric acid iron oxide, lithium phosphoric acid nickel oxide, or lithium phosphoric acid cobalt oxide, or a combination thereof.

In some embodiments, the positive active material layer may include from about 65 wt % to about 90 wt % of said positive active material, based on the total weight of the positive active material layer.

In some embodiments, the positive active material layer may include from about 1 wt % to about 30 wt % of said active carbon, based on the total weight of the positive active material layer. In some embodiments, the positive active material layer may include from about 3 wt % to about 10 wt % of said active carbon, based on the total weight of the positive active material layer.

In some embodiments, the active carbon may include particles having an average diameter of about 1 to about 30 μm. In some embodiments, the active carbon may include particles having an average diameter of about 5 to about 10 μm.

In some embodiments, the additive may include particles having an average diameter of about 0.01 to about 20 μm. In some embodiments, the additive may include particles having an average diameter of about 0.1 to about 1 μm.

In some embodiments, the weight ratio of the active carbon to the additive is from 1:0.03 to 1:0.3.

DETAILED DESCRIPTION

Exemplary embodiments of the present disclosure will hereinafter be described in detail. However, these embodiments are only exemplary, and this disclosure is not limited thereto.

Some embodiments provide a positive electrode for a lithium rechargeable battery including a current collector; and a positive active material layer disposed on the current collector, wherein the positive active material layer includes a positive active material, active carbon, and an additive.

In some embodiments, the current collector may be Al but is not limited thereto.

In some embodiments, the positive active material may be a lithium metal oxide.

In some embodiments, the lithium metal oxide may be lithium-cobalt-based oxide, lithium-nickel-cobalt-manganese oxide, lithium-phosphorous-nickel-based oxide, lithium-phosphorous-cobalt-based oxide, or a combination thereof.

Examples of the lithium metal oxides may be as below.
$Li_aA'_{1-b}R'''_bD^1_2$ (0.90≤a≤1.8 and 0≤b≤0.5);
$Li_aE_{1-b}R'''_bO_{2-c}D^1_c$ (0.90≤a≤1.8, 0≤b≤0.5 and 0≤c≤0.05);
$LiE_{2-b}R'''_bO_{4-c}D^1_c$ (0≤b≤0.5, 0≤c≤0.05);
$Li_aNi_{1-b-c}Co_bR'''_cD^1_\alpha$ (0.90≤a≤1.8, 0≤b≤0.5, 0≤c≤0.05 and 0≤α≤2);
$Li_aNi_{1-b-c}Co_bR'''_cO_{2-\alpha}Z_\alpha$ (0.90≤a≤1.8, 0≤b≤0.5, 0≤c≤0.05 and 0≤α≤2);
$Li_aNi_{1-b-c}Co_bR'''_cO_{2-\alpha}Z_2$ (0.90≤a≤1.8, 0≤b≤0.5, 0≤c≤0.05 and 0≤α≤2);
$Li_aNi_{1-b-c}Mn_bR'''_cD^1_c$ (0.90≤a≤1.8, 0≤b≤0.5, 0≤c≤0.05 and 0≤α≤2);
$Li_aNi_{1-b-c}Mn_bR'''_cO_{2-\alpha}Z_\alpha$ (0.90≤a≤1.8, 0≤b≤0.5, 0≤c≤0.05 and 0<α<2);
$Li_aNi_{1-b-c}Mn_bR'''_cO_{2-\alpha}Z_2$ (0.90≤a≤1.8, 0≤b≤0.5, 0≤c≤0.05 and 0<α<2);
$Li_aNi_bE_cG_dO_2$ (0.90≤a≤1.8, 0≤b≤0.9, 0≤c≤0.5 and 0.001≤d≤0.1);
$Li_aNi_bCo_cMn_dGeO_2$ (0.90≤a≤1.8, 0≤b≤0.9, 0≤c≤0.5, 0≤d≤0.5 and 0.001≤e≤0.1);
$Li_aNiG_bO_2$ (0.90≤a≤1.8 and 0.001≤b≤0.1);
$Li_aCoG_bO_2$ (0.90≤a≤1.8 and 0.001≤b≤0.1);
$Li_aMnG_bO_2$ (0.90≤a≤1.8 and 0.001≤b≤0.1);
$Li_aMn_2G_bO_2$ (0.90≤a≤1.8 and 0.001≤b≤0.1);
$QO_2$; $QS_2$; $LiQS_2$; $V_2O_5$; $LiV_2O_5$; $LiTO_2$; $LiNiVO_4$; $Li_{(3-f)}J_2(PO_4)_3$ (0≤f≤2);
$Li_{(3-f)}Fe_2(PO_4)_3$ (0≤f≤2); and $LiFePO_4$.

In the above chemical formulae, A' may be Ni, Co, Mn, or a combination thereof; R''' may be Al, Ni, Co, Mn, Cr, Fe, Mg, Sr, V, a rare earth element, or a combination thereof; $D^1$ may be O (oxygen), F (fluorine), S (sulfur), P (phosphorus), or a combination thereof; E may be Co, Mn, or a combination thereof; Z may be F (fluorine), S (sulfur), P (phosphorus), or a combination thereof; G may be Al, Cr, Mn, Fe, Mg, La, Ce, Sr, V, or a combination thereof; Q may be Ti, Mo, Mn, or a combination thereof; T may be Cr, V, Fe, Sc, Y, or a combination thereof; and J may be V, Cr, Mn, Co, Ni, Cu, or a combination thereof.

In some embodiments, the compound may have a coating layer on the surface or may be mixed with a compound having a coating layer. In some embodiments, the coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. In some embodiments, the compounds for a coating layer can be amorphous or crystalline. In some embodiments, the coating element for a coating layer may include Mg, Al, Co, K, Na, Ca, Si, Ti, V, Sn, Ge, Ga, B, As, Zr, or a mixture thereof. In some embodiments, the coating layer can be formed in a method having no negative influence on properties of a positive active material by including these elements in the compound. For example, the method may include any coating method such as spray coating, dipping, and the like but is not illustrated in more detail, since well-known to those who work in the related field.

In some embodiments, the positive active material may be included in 65 wt % to 90 wt %, specifically in 70 wt % to 85 wt %, based on the total weight of the positive active material layer. Within this range, the lithium rechargeable battery may have improved capacity, cycle-life, and high rate charge/discharge properties.

In some embodiments, the active carbon may improve the high rate charge/discharge properties of the lithium rechargeable battery by way of the ions' absorption and dissociation, not by a chemical reaction, but by a physical reaction.

In some embodiments, the active carbon may have an average diameter of 1 to 30 μm, specifically 3 to 20 μm, more specifically 5 to 10 μm. Within these ranges, the active carbon has similar average diameter to that of the positive active material, thus the dispersity of the active carbon may be good.

Here, the average diameter may be measured using a solution including particles dispersed therein and a laser. For example, the average diameter may be measured using a refraction angle of laser by the particles dispersed in the solution. The average diameter may be average value of size of the dispersed particles.

In some embodiments, the active carbon may be comprised in 1 to 30 wt %, specifically 3 to 25 wt %, more specifically 3 to 10 wt %, based on the total weight of the positive active material. Within these ranges, the lithium rechargeable battery including the active carbon may have improved capacity, cycle-life, and high charge/discharge rate.

In some embodiments, the additive may comprise a transition metal oxide.

In some embodiments, transition metal oxide may comprise a manganese oxide, cobalt oxide, iron oxide, vanadium oxide, or a combination thereof.

In some embodiments, the manganese oxide may comprise a compound represented by Chemical Formula 1 below, the cobalt based oxide may comprise a compound represented by Chemical Formula 2 below, the iron based oxide may comprise a compound represented by Chemical Formula 3 below, and a vanadium based oxide may comprise a compound represented by Chemical Formula 4 below.

In some embodiments, a manganese oxide represented by Chemical 1 below may be used as the additive.

$Mn_3O_4$;           Chemical Formula 1

$Co_3O_4$;           Chemical Formula 2

$Fe_3O_4$; and          Chemical Formula 3

$V_2O_5$.            Chemical Formula 4

In some embodiments, the manganese oxide represented by Chemical Formula 1 has spinel structures, and the number of the peripheral electrons of Mn may change from $2^+$ to $3^+$. When using a transition metal, such as, Co, Fe, V, and the like, as well as Mn, in a stable oxide form in a positive electrode, the lithium rechargeable battery has improved capacity as the lithium ion concentration on the surface of the electrode increases, since the anions are absorbed onto the surfaces of the additives.

In some embodiments, the active carbon facilitates lithium ions' physical adsorption to the surfaces of the additives, thereby fast delivery of the lithium ions to the positive active material. In some embodiments, the oxide used as the additive increases the lithium ions' dispersion on the surface through a reduction reaction, whereby enhancing the properties of the active carbon, as well as providing electron's a pathway. In this way, the positive electrode according to one embodiment reduces internal resistance and increases conductivity to achieve high rate charge/discharge properties.

In some embodiments, the active carbon and the additive may be included in a weight ratio of 1:0.03 to 1:0.3, specifically 1:0.05 to 1:0.25, more specifically 1:0.05 to 1:0.23. Within this range, the lithium rechargeable battery may have improved capacity, cycle-life, and high rate charge/discharge properties.

In some embodiments, the additive may have an average diameter of 0.01 to 20 μm, specifically 0.1 to 1 μm. Within this range, the additive has good dispersability with the positive electrode active material and the active carbon.

Here, the average diameter may be measured with the same method as the average diameter of the active carbon.

In some embodiments, the additive may be included 0.01 to 15 wt %, specifically 0.05 to 10 wt %, more specifically 0.05 to 3 wt %, based on the total weight of the positive active material. Within this range, the lithium rechargeable battery may have improved capacity, cycle-life, and high rate charge/discharge properties.

In some embodiments, the positive active material layer may include a binder and a conductive material. The binder improves binding properties of the positive active material particles to one another and to a current collector. Examples of the binder include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is used to provide conductivity to an electrode. In the battery including the same, it may include any electronic conductive material as long as causing no chemical change. Examples of the conductive material includes one or at least one kind mixture of a conductive material such as natural graphite, artificial graphite, carbon black, acetylene black, ketjen black, a carbon fiber, a metal powder, a metal fiber or the like such as copper, nickel, aluminum, silver or the like, or a polyphenylene derivative or the like.

In some embodiments, the binder may be included in 2 to 10 wt %, specifically 3 to 7 wt %, based on the total weight of the positive active material. In some embodiments, the conductive material may be included in 1 to 8 wt %, specifically in 2 to 5 wt %, based on the total weight of the positive active material.

In some embodiments, the positive electrode may be fabricated by coating a composition of a positive active material layer on the surface of the current collector to form a positive active material layer, and drying and pressing the coating.

Hereinafter, the lithium rechargeable battery including the above positive electrode is described in detail, referring to FIG. 1.

Figure 1:
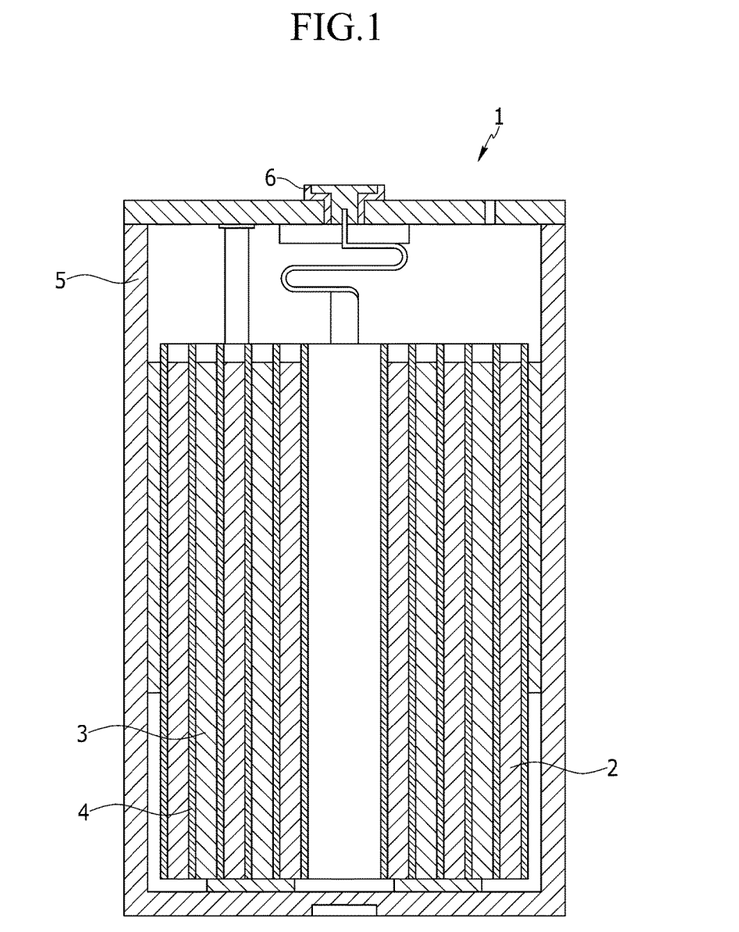
FIG. 1 is an exploded perspective view showing a rechargeable lithium battery according to one embodiment.

Referring to FIG. 1, the rechargeable lithium battery 1 includes an electrode assembly including a positive electrode 2, a negative electrode 3, and a separator 4 between the positive electrode 2 and the negative electrode 3, a battery case 5 for housing the electrode assembly, an electrolyte injected in the case from the top, and a cap plate 6 sealing the battery case 5.

Details of the positive electrode are the same as described above.

In some embodiments, the negative electrode for a rechargeable lithium battery includes a current collector and a negative active material layer formed on the current collector, and the negative active material layer includes a negative active material.

In some embodiments, the current collector may be a copper foil, a nickel foil, a stainless steel foil, a titanium foil, a nickel foam, a copper foam, a polymer substrate coated with a conductive metal, or a combination thereof.

In some embodiments, the negative active material layer may include negative electrode active material, a binder, and optionally a conductive material.

In some embodiments, the negative active material may include a material that reversibly intercalates/deintercalates lithium ions, lithium metal, a lithium metal alloy, a material being capable of doping/dedoping lithium, or a transition metal oxide.

In some embodiments, the material that reversibly intercalates/deintercalates lithium ions may be a carbon material. The carbon material may be any generally-used carbon-based negative active material in a lithium ion rechargeable battery. Examples of the carbon material include crystalline carbon, amorphous carbon, and a combination thereof. In some embodiments, the crystalline carbon may be non-shaped, or sheet, flake, spherical, or fiber shaped natural graphite or artificial graphite. In some embodiments, the amorphous carbon may be a soft carbon, a hard carbon, a mesophase pitch carbonized product, fired coke, and the like.

In some embodiments, the lithium metal alloy includes lithium and a metal of Na, K, Rb, Cs, Fr, Be, Mg, Ca, Sr, Si, Sb, Pb, In, Zn, Ba, Ra, Ge, Al, or Sn.

Examples of the material being capable of doping/dedoping lithium include Si, a Si—C composite, $SiO_x$ (0<x<2), a Si—Y alloy (wherein Y is an alkali metal, an alkaline-earth metal, 1 Group 13 to 16 elements, a transition element, a rare earth element, or a combination thereof, and not Si), Sn, $SnO_2$, a Sn—C composite, Sn—Y (wherein Y is an alkali metal, an alkaline-earth metal, Group 13 to 16 elements, a transition element, a rare earth element, or a combination thereof, and not Sn), and the like. Specific elements of the Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof. In some embodiments, the element Y may be Mg, Ca, Sr, Ba, Sc, Y, Ti, Zr, Hf, V, Nb, Ta, Cr, Mo, W, Re, Fe, Pb, Ru, Os, Rh, Ir, Pd, Pt, Cu, Ag, Au, Zn, Cd, B, Al, Ga, Sn, In, Ti, Ge, P, As, Sb, Bi, S, Se, Te, or a combination thereof.

In some embodiments, the transition metal oxide may be vanadium oxide, lithium vanadium oxide, and the like.

In some embodiments, the negative active material may preferably include said amorphous carbon, specifically an amorphous carbon sintered at between 400° C. to 1500° C. In some embodiments, the lithium rechargeable battery may have improved high rate charge/discharge property by using the amorphous carbon as a negative electrode material.

The binder improves binding properties of negative active material particles with one another and with a current collector. Examples of the binder include polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to improve electrode conductivity. Any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of metal powder or metal fiber including copper, nickel, aluminum, silver, and the like; a conductive polymer such as polyphenylene derivatives; or a mixture thereof.

In some embodiments, the negative and electrode may be fabricated in a method of mixing the active material, a conductive material, and a binder in a solvent to prepare a negative active material composition and coating the composition on a current collector. The electrode manufacturing method is well known and thus, is not described in detail in the present specification. In some embodiments, the solvent includes N-methylpyrrolidone and the like but is not limited thereto.

In some embodiments, the electrolyte includes a non-aqueous organic solvent and a lithium salt. The non-aqueous organic solvent serves as a medium for transmitting ions taking part in the electrochemical reaction of a battery. In some embodiments, the non-aqueous organic solvent may include a carbonate-based, ester-based, ether-based, ketone-based, alcohol-based, or aprotic solvent.

Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like.

When the carbonate-based solvent is prepared by mixing a cyclic carbonate and a linear carbonate, the solvent has advantages of high permittivity and low viscosity. The cyclic carbonate and the linear carbonate are mixed together in a volume ratio of about 1:1 to about 1:9.

Examples of the ester-based solvent may include methyl acetate, ethyl acetate, n-propyl acetate, dimethylethyl acetate, methylpropinonate, ethylpropinonate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and examples of the ketone-based solvent include cyclohexanone, and the like. Examples of the alcohol-based solvent include ethyl alcohol, isopropyl alcohol, and the like.

The non-aqueous organic solvent may be used singularly or in a mixture. When the organic solvent is used in a mixture, the mixing ratio can be controlled in accordance with a desirable battery performance.

In some embodiments, the non-aqueous electrolyte may further include an overcharge inhibitor, such as, ethylene carbonate, pyrocarbonate, and the like.

Lithium salt is dissolved in an organic solvent to be used as a lithium ion source in a lithium rechargeable battery, thus making the battery operate and promoting the lithium ion's delivery between positive and negative electrodes.

Examples of the lithium salt include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}O_2)$ (where x and y are natural numbers of 1 to 20, respectively), LiCl, LiI, $LiB(C_2O_4)_2$ (lithium bis(oxalato) borate), and a combination thereof.

In some embodiments, the concentration of the lithium ion salt in the lithium rechargeable battery may be between about 0.1M and about 2.0M. Within these ranges, the electrolyte may have proper viscosity and good conductivity to exhibit good electrolyte properties, and the lithium ions may effectively move in the lithium rechargeable battery.

The separator may be any material used in the art to which the embodiments pertain, as long as it can separate the positive and the negative electrodes and provide a pathway through which the lithium ions can transfer.

That is, a material, which is low resistive to the ion's movement of the electrolyte and has a good moisture containing property, may be used as the separator. For example, glass fiber, polyester, polyethylene, polypropylene, polytetrafluoroethylene (PTFE), or a combination thereof may be selected as a separator. The separator may be in a woven or non-woven form. For example, a polyethylene based separator, such as, polyethylene, polypropylene, and the like, is usually selected in a lithium rechargeable battery. In order to increase the heat-resistibility or mechanical strength, a separator coated with a ceramic component or a polymer material may be used, which may also be fabricated in a monolayer or a multilayers.

The following examples illustrate the present disclosure in more detail. These examples, however, should not in any sense be interpreted as limiting the scope of the present disclosure.

EXAMPLES

Example 1

85 wt % of $LiCoO_2$ (average diameter of 5 μm), 5 wt % of active carbon (YP, average diameter of 7 μm), 7 parts by weight of $Mn_3O_4$ (average diameter of 0.3 μm) based on 100 parts by weight of the active carbon, 4 wt % of carbon black, and 6 wt % of polyvinylidene fluoride (PVdF) were mixed and dispersed in N-methyl-2-pyrolidone to prepare a positive active material composition.

90 wt % of soft carbon and 10 wt % of polyvinylidene fluoride (PVdF) were mixed and dispersed in N-methyl-2-pyrolidone to prepare a negative active material composition. The negative active material composition was coated on a copper foil, dried, and pressed to form a negative electrode.

After interposing a polyethylene separator between the positive and negative electrodes, an electrolyte made of a solvent mixed with ethylene carbonate (EC), ethyl methyl carbonate (EMC), and dimethyl carbonate (DMC) (mixed in ratio of 2:2:6 in volume) and containing 1M $LiPF_6$ was injected to fabricate a lithium rechargeable battery.

Example 2

A lithium rechargeable battery was fabricated in the same method as in Example 1, except that 85 wt % of $LiCoO_2$ (average diameter of 5 μm), 5 wt % of active carbon (YP, average diameter of 7 μm), 14 parts by weight of $Mn_3O_4$ (average diameter of 0.3 μm) based on 100 parts by weight of the active carbon, 4 wt % of carbon black, and 6 wt % of polyvinylidene fluoride (PVdF) were mixed and dispersed in N-methyl-2-pyrolidone to prepare a positive active material composition.

Example 3

A lithium rechargeable battery was fabricated in the same method as in Example 1, except that 85 wt % of $LiCoO_2$ (average diameter of 5 μm), 5 wt % of active carbon (YP, average diameter of 7 μm), 21 parts by weight of $Mn_3O_4$ (average diameter of 0.3 μm) based on 100 parts by weight of the active carbon, 4 wt % of carbon black, and 6 wt % of polyvinylidene fluoride (PVdF) were mixed and dispersed in N-methyl-2-pyrolidone to prepare a positive active material composition.

Example 4

A lithium rechargeable battery was fabricated in the same method as in Example 1, except that 85 wt % of $LiCoO_2$ (average diameter of 5 μm), 5 wt % of active carbon (YP, average diameter of 7 μm), 7 parts by weight of $Co_3O_4$ (average diameter of 0.3 μm) based on 100 parts by weight of the active carbon, 4 wt % of carbon black, and 6 wt % of polyvinylidene fluoride (PVdF) were mixed and dispersed in N-methyl-2-pyrolidone to prepare a positive active material composition.

Example 5

A lithium rechargeable battery was fabricated in the same method as in Example 1, except that 85 wt % of $LiCoO_2$ (average diameter of 5 μm), 5 wt % of active carbon (YP, average diameter of 7 μm), 14 parts by weight of $Co_3O_4$ (average diameter of 0.3 μm) based on 100 parts by weight of the active carbon, 4 wt % of carbon black, and 6 wt % of polyvinylidene fluoride (PVdF) were mixed and dispersed in N-methyl-2-pyrolidone to prepare a positive active material composition.

Example 6

A lithium rechargeable battery was fabricated in the same method as in Example 1, except that 85 wt % of $LiCoO_2$ (average diameter of 5 μm), 5 wt % of active carbon (YP, average diameter of 7 μm), 21 parts by weight of $Co_3O_4$ (average diameter of 0.3 μm) based on 100 parts by weight of the active carbon, 4 wt % of carbon black, and 6 wt % of polyvinylidene fluoride (PVdF) were mixed and dispersed in N-methyl-2-pyrolidone to prepare a positive active material composition.

Example 7

A lithium rechargeable battery was fabricated in the same method as in Example 1, except that 85 wt % of $LiCoO_2$ (average diameter of 5 μm), 5 wt % of active carbon (YP, average diameter of 7 μm), 7 parts by weight of $Fe_3O_4$ (average diameter of 0.3 μm) based on 100 parts by weight of the active carbon, 4 wt % of carbon black, and 6 wt % of polyvinylidene fluoride (PVdF) were mixed and dispersed in N-methyl-2-pyrolidone to prepare a positive active material composition.

Example 8

A lithium rechargeable battery was fabricated in the same method as in Example 1, except that 85 wt % of $LiCoO_2$ (average diameter of 5 μm), 5 wt % of active carbon (YP, average diameter of 7 μm), 14 parts by weight of $Fe_3O_4$ (average diameter of 0.3 μm) based on 100 parts by weight of the active carbon, 4 wt % of carbon black, and 6 wt % of polyvinylidene fluoride (PVdF) were mixed and dispersed in N-methyl-2-pyrolidone to prepare a positive active material composition.

Example 9

A lithium rechargeable battery was fabricated in the same method as in Example 1, except that 85 wt % of $LiCoO_2$ (average diameter of 5 μm), 5 wt % of active carbon (YP, average diameter of 7 μm), 21 parts by weight of $Fe_3O_4$ (average diameter of 0.3 μm) based on 100 parts by weight of the active carbon, 4 wt % of carbon black, and 6 wt % of polyvinylidene fluoride (PVdF) were mixed and dispersed in N-methyl-2-pyrolidone to prepare a positive active material composition.

Example 10

A lithium rechargeable battery was fabricated in the same method as in Example 1, except that 85 wt % of $LiCoO_2$ (average diameter of 5 μm), 5 wt % of active carbon (YP, average diameter of 7 μm), 7 parts by weight of $V_2O_5$ (average diameter of 0.3 μm) based on 100 parts by weight of the active carbon, 4 wt % of carbon black, and 6 wt % of polyvinylidene fluoride (PVdF) were mixed and dispersed in N-methyl-2-pyrolidone to prepare a positive active material composition.

Example 11

A lithium rechargeable battery was fabricated in the same method as in Example 1, except that 85 wt % of $LiCoO_2$ (average diameter of 5 μm), 5 wt % of active carbon (YP, average diameter of 7 μm), 14 parts by weight of $V_2O_5$ (average diameter of 0.3 μm) based on 100 parts by weight of the active carbon, 4 wt % of carbon black, and 6 wt % of polyvinylidene fluoride (PVdF) were mixed and dispersed in N-methyl-2-pyrolidone to prepare a positive active material composition.

Example 12

A lithium rechargeable battery was fabricated in the same method as in Example 1, except that 85 wt % of $LiCoO_2$ (average diameter of 5 μm), 5 wt % of active carbon (YP, average diameter of 7 μm), 21 parts by weight of $V_2O_5$ (average diameter of 0.3 μm) based on 100 parts by weight of the active carbon, 4 wt % of carbon black, and 6 wt % of polyvinylidene fluoride (PVdF) were mixed and dispersed in N-methyl-2-pyrolidone to prepare a positive active material composition.

Comparative Example 1

A lithium rechargeable battery was fabricated in the same method as in Example 1, except that 85 wt % of $LiCoO_2$ (average diameter of 5 μm), 5 wt % of active carbon (YP, average diameter of 7 μm), 4 wt % of carbon black, and 6 wt % of polyvinylidene fluoride (PVdF) were mixed and dispersed in N-methyl-2-pyrolidone to prepare a positive active material composition.

Comparative Example 2

A lithium rechargeable battery was fabricated in the same method as in Example 1, except that 85 wt % of $LiNi_{1/3}CO_{1/3}Mn_{1/3}O_2$, 5 wt % of active carbon (average diameter of 7 μm), 4 wt % of carbon black, and 6 wt % of polyvinylidene fluoride (PVdF) were mixed and dispersed in N-methyl-2-pyrolidone to prepare a positive active material composition.

Comparative Example 3

A lithium rechargeable battery was fabricated in the same method as in Example 1, except that 85 wt % of $LiFePO_4$, 5 wt % of active carbon (average diameter of 7 μm), 4 wt % of carbon black, and 6 wt % of polyvinylidene fluoride (PVdF) were mixed and dispersed in N-methyl-2-pyrolidone to prepare a positive active material composition.

Experimental Example 1: Capacity Characteristic Evaluation

Constant current at 1 C was charged to each lithium rechargeable battery fabricated according to Examples 1 to 12 and Comparative Examples 1 to 3, and it was terminated when the voltage of the battery reaches 4.2V, and the capacity was measured when the batteries are discharged at 50 C current to 2.0V. The results are described in Tables 1 and 2.

Figure 2:
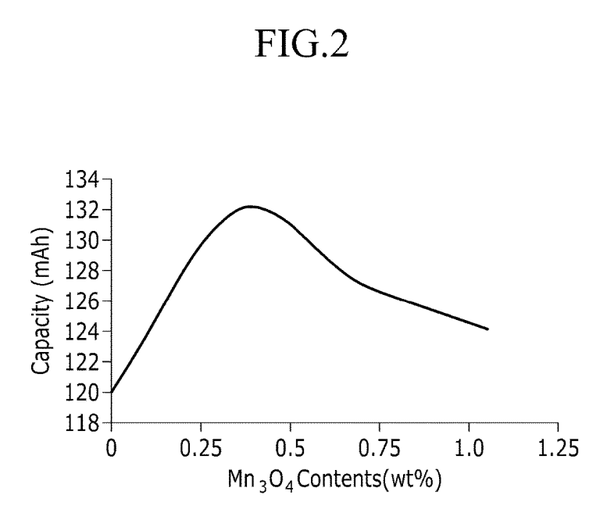
FIG. 2 shows Capacity characteristic of the lithium rechargeable battery of Example 1.

FIG. 2 shows the capacity characteristics of the lithium rechargeable batteries according to Example 1.

Experimental Example 2: High Rate Charge/Discharge Characteristics Evaluation

Lithium rechargeable battery fabricated according to Examples 1 to 12 and Comparative Examples 1 to 3 were charged and discharged in the same conditions as in Experimental Example 1, and the capacity retention (%) of 30 C/1 C was measured. The results are shown in Table 1, and FIGS. 3 and 4.

Figure 3:
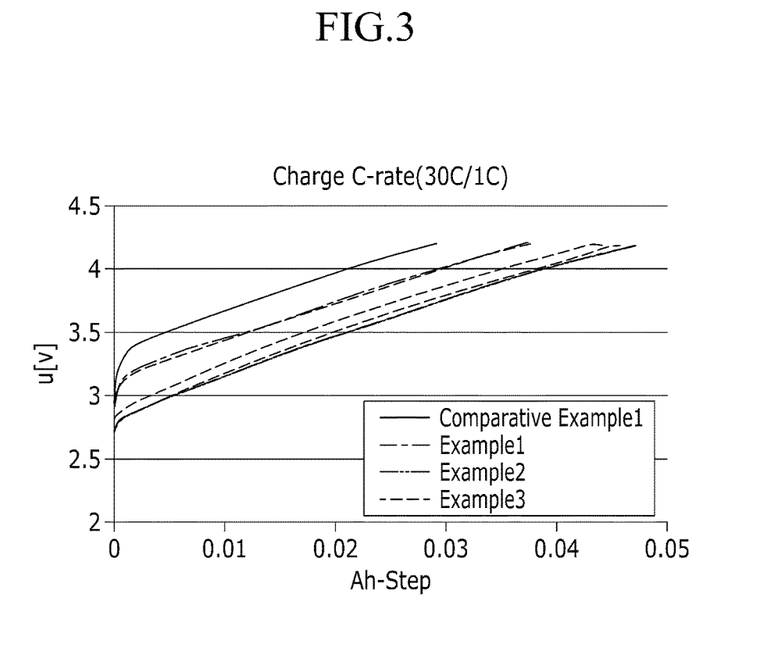
FIG. 3 shows high rate charge characteristics of the lithium rechargeable batteries of Examples 1 to 3, and Comparative Example 1.
Figure 4:
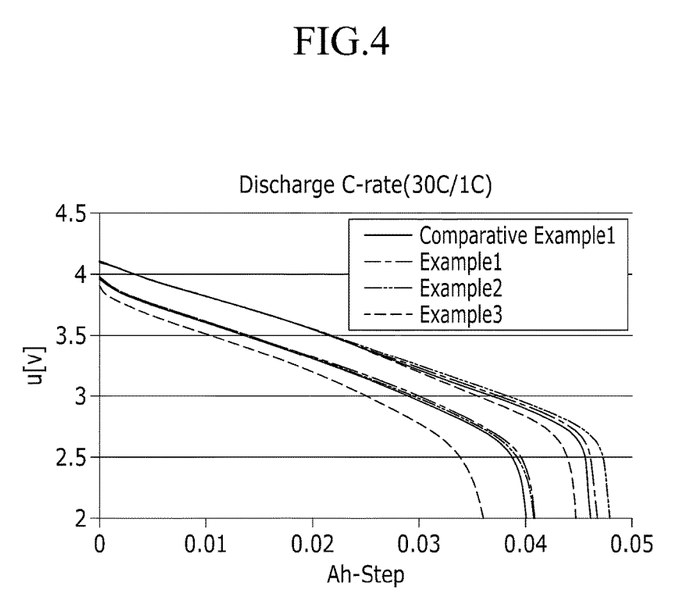
FIG. 4 shows high rate discharge characteristics of the lithium rechargeable batteries of Examples 1 to 3, and Comparative Example 1.

FIG. 3 shows the high rate charge characteristic of the lithium rechargeable batteries according to Examples 1 to 3, and Comparative Example 1. FIG. 4 shows the high rate discharge characteristic of the lithium rechargeable batteries according to Examples 1 to 3, and Comparative Example 1.

The capacity retention (%) of 30 C/1 C is obtained by comparing the percentage of the discharge capacity at 1 C to the discharge capacity at 30 C.

Experimental Example 3: Cycle-Life Characteristics Evaluation

Lithium rechargeable battery fabricated according to Examples 1 to 12 and Comparative Examples 1 to 3 were charged and discharged for 1000 cycles in the same conditions as in Experimental Example 1, and the capacity retention (%) of $1000^{th}/1^{st}$ cycle is measured. The results are shown in Table 1, and FIG. 5.

Figure 5:
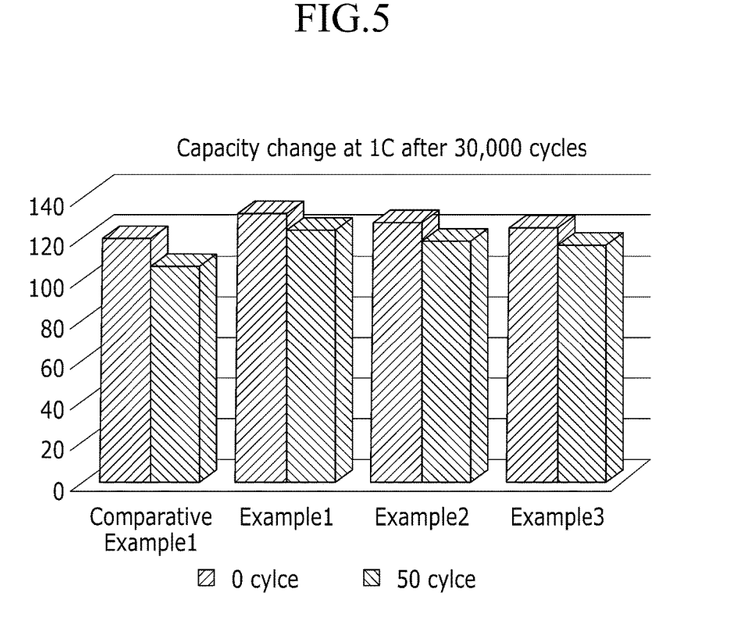
FIG. 5 shows cycle-life characteristics of the lithium rechargeable batteries of Examples 1 to 3, and Comparative Example 1.

FIG. 5 shows the cycle-life characteristic of the lithium rechargeable batteries according to Examples 1 to 3, and Comparative Example 1.

The capacity retention (%) of $1000^{th}/1^{st}$ is obtained from the percentage of the discharge capacity at the $1^{st}$ cycle to the discharge capacity at the $1000^{th}$ cycle.

TABLE 1

|  | Capacity (mAh) | Capacity retention (%) of 30 C/1 C | Capacity retention (%) of $1000^{th}/1^{th}$ cycle |
|---|---|---|---|
| Example 1 | 132 | 86 | 93 |
| Example 2 | 127.2 | 87 | 93 |
| Example 3 | 124.2 | 87 | 94 |
| Example 4 | 128 | 86 | 93 |
| Example 5 | 122.3 | 87 | 93 |
| Example 6 | 115.2 | 87 | 93 |
| Example 7 | 122.5 | 86 | 93 |
| Example 8 | 116.4 | 87 | 92 |
| Example 9 | 110.1 | 87 | 92 |
| Example 10 | 127.6 | 86 | 93 |
| Example 11 | 120.5 | 87 | 93 |
| Example 12 | 113.7 | 87 | 93 |
| Comparative Example 1 | 120 | 81 | 88 |
| Comparative Example 2 | 128 | 83 | 89 |
| Comparative Example 3 | 115 | 79 | 78 |

From the results of Table 1 above, and FIGS. 3 to 5, the lithium rechargeable batteries comprising a positive active material, active carbon, and an additive according to Examples 1 to 12 have improved capacity, high rate charge/discharge, and cycle-life characteristics compared to Comparative Examples 1 to 3 which do not include the additives.

In the present disclosure, the terms "Example," "Comparative Example" and "Experimental Example" are used arbitrarily to simply identify a particular example or experimentation and should not be interpreted as admission of prior art. While this disclosure has been described in connection with what is presently considered to be practical exemplary embodiments, it is to be understood that the invention is not limited to the disclosed embodiments and is intended to cover various modifications and equivalent arrangements included within the spirit and scope of the appended claims.

What is claimed is:

1. A positive electrode for a rechargeable lithium battery, comprising:
    a current collector; and
    a positive active material layer disposed on the current collector,
    wherein the positive active material layer comprises
        a positive active material including a lithium metal oxide, wherein the lithium metal oxide is lithium cobalt oxide, or lithium nickel cobalt manganese oxide;
        active carbon comprising particles having an average diameter of about 1 to about 30 μm;
        a conductive material, wherein the conductive material is carbon black; and
        an additive including a transition metal oxide, wherein the additive comprises particles having an average diameter of about 0.01 to about 20 μm and wherein the transition metal oxide is $Mn_3O_4$ and comprising from about 0.01 to about 15 wt % of said additive, based on the total weight of the positive active material layer.

2. The positive electrode of claim 1, wherein the transition metal oxide is $Mn_3O_4$.

3. The positive electrode of claim 1, comprising from about 0.05 to about 3 wt % of said additive, based on the total weight of the positive active material layer.

4. The positive electrode of claim 1, wherein the lithium metal oxide is lithium cobalt oxide.

5. The positive electrode of claim 1, comprising from about 65 wt % to about 90 wt % of said positive active material, based on the total weight of the positive active material layer.

6. The positive electrode of claim 1, comprising from about 1 wt % to about 30 wt % of said active carbon, based on the total weight of the positive active material layer.

7. The positive electrode of claim 6, comprising from about 3 wt % to about 10 wt % of said active carbon, based on the total weight of the positive active material layer.

8. The positive electrode of claim 1, wherein the active carbon comprises particles having an average diameter of about 5 to about 10 μm.

9. The positive electrode of claim 1, wherein the additive comprises particles having an average diameter of about 0.01 to about 1 μm.

10. The positive electrode of claim 9, wherein the additive comprises particles having an average diameter of about 0.1 to about 1 μm.

11. The positive electrode of claim 1, wherein the weight ratio of the active carbon to the additive is from 1:0.03 to 1:0.3.

12. A rechargeable lithium battery, comprising
the positive electrode of claim 1;
a negative electrode comprising a negative active material; and
a non-aqueous electrolyte.

13. The rechargeable lithium battery of claim 1, wherein the additive comprises particles having an average diameter of about 0.1 to about 1 μm.

14. The rechargeable lithium battery of claim 13, comprising from about 0.05 to about 3 wt % of said additive, based on the total weight of the positive active material layer.

15. The rechargeable lithium battery of claim 1, wherein the lithium metal oxide is lithium cobalt oxide.

* * * * *